United States Patent
Ouchida et al.

(10) Patent No.: US 10,621,800 B2
(45) Date of Patent: Apr. 14, 2020

(54) REMOTE SERVER

(71) Applicant: YANMAR CO., LTD., Osaka-shi, Osaka (JP)

(72) Inventors: Takeshi Ouchida, Osaka (JP); Shingo Eguchi, Osaka (JP)

(73) Assignee: YANMAR CO., LTD., Osaka (JP)

( * ) Notice: Subject to any disclaimer, the term of this patent is extended or adjusted under 35 U.S.C. 154(b) by 242 days.

(21) Appl. No.: 14/914,417

(22) PCT Filed: Aug. 12, 2014

(86) PCT No.: PCT/JP2014/071316
§ 371 (c)(1),
(2) Date: Feb. 25, 2016

(87) PCT Pub. No.: WO2015/029774
PCT Pub. Date: Mar. 5, 2015

(65) Prior Publication Data
US 2016/0210796 A1 Jul. 21, 2016

(30) Foreign Application Priority Data
Aug. 28, 2013 (JP) ................................ 2013-176841

(51) Int. Cl.
*E02F 9/24* (2006.01)
*G07C 5/08* (2006.01)
(Continued)

(52) U.S. Cl.
CPC ......... *G07C 5/0808* (2013.01); *A01D 41/127* (2013.01); *F02D 29/02* (2013.01);
(Continued)

(58) Field of Classification Search
CPC combination set(s) only.
See application file for complete search history.

(56) References Cited

U.S. PATENT DOCUMENTS 6,919,865 B2    7/2005    Tamaru
8,533,018 B2    9/2013    Miwa et al.
(Continued)

FOREIGN PATENT DOCUMENTS

CN    1875386 A    12/2006
EP    2383395 A1    11/2011
(Continued)

OTHER PUBLICATIONS

International Search Report corresponding to Application No. PCT/JP2014/071316; Date of Mailing: Nov. 4, 2014, with English translation.

(Continued)

*Primary Examiner* — Adam D Tissot
*Assistant Examiner* — Edward J Pipala
(74) *Attorney, Agent, or Firm* — Norton Rose Fulbright US LLP (57) ABSTRACT

At least one embodiment may provide a remote server that can determine occurrence of an abnormal condition in a power transmission system without using a threshold value in advance. There may be provided a remote server that receives operating and non-operating information of a working unit, information on a working date, information on a traveling speed, and information on a load factor of an engine, respectively from a combine harvester. The remote server calculates for each predetermined period an average of the engine load factor while the traveling speed is at or above a predetermined traveling speed with all working units in non-operation. If the average during a predetermined period is in a status of a predetermined difference from the average up to the predetermined period, the remote server determines that a moving power transmission mechanism of a traveling system of the combine harvester is in an abnormal condition.

6 Claims, 6 Drawing Sheets

(51) Int. Cl.
*G06Q 50/10* (2012.01)
*F02D 29/02* (2006.01)
*A01D 41/127* (2006.01)
*F02D 41/02* (2006.01)
*F02D 41/18* (2006.01)
*F02D 41/22* (2006.01)
*F02D 41/26* (2006.01)
*F16H 61/12* (2010.01)
*H04L 29/08* (2006.01)
*G07C 5/00* (2006.01)

(52) U.S. Cl.
CPC ......... *F02D 41/0215* (2013.01); *F02D 41/18* (2013.01); *F02D 41/221* (2013.01); *F02D 41/266* (2013.01); *F16H 61/12* (2013.01); *G06Q 50/10* (2013.01); *G07C 5/0816* (2013.01); *H04L 67/12* (2013.01); *B60Y 2200/22* (2013.01); *F02D 2200/501* (2013.01); *F16H 2061/1208* (2013.01); *G07C 5/008* (2013.01)

(56) References Cited

U.S. PATENT DOCUMENTS

| | | | |
|---|---|---|---|
| 2002/0045986 A1 | 4/2002 | Tamaru | |
| 2002/0059320 A1 | 5/2002 | Tamaru | |
| 2003/0137194 A1 | 7/2003 | White et al. | |
| 2003/0216889 A1 | 11/2003 | Marko et al. | |
| 2007/0094055 A1 | 4/2007 | Nakayama et al. | |
| 2009/0259507 A1 | 10/2009 | Miwa et al. | |
| 2010/0072290 A1* | 3/2010 | Dage | B60H 1/00657 236/51 |
| 2011/0227744 A1 | 9/2011 | Shibata et al. | |
| 2012/0258839 A1* | 10/2012 | Smithson | B60H 1/3222 477/42 |
| 2013/0066583 A1* | 3/2013 | Foussard | B60W 40/02 702/130 |

FOREIGN PATENT DOCUMENTS

| | | |
|---|---|---|
| JP | 2002188183 A | 7/2002 |
| JP | 2003120405 A | 4/2003 |
| JP | 2004301230 A | 10/2004 |
| JP | 2006302096 A | 11/2006 |
| JP | 2007100305 A | 4/2007 |
| JP | 2010156152 A | 7/2010 |
| WO | 2004/049161 A1 | 6/2004 |

OTHER PUBLICATIONS

Extended European Search Report corresponding to Application No. 14840510.3-1953/3040936 PCT/2014071316; dated Apr. 12, 2017.

KIPO Notification of Reason for Refusal corresponding to KR Application No. 10-2016-7007194; dated Jun. 5, 2017.

Chinese Office Action dated Dec. 6, 2018 issued in corresponding Chinese Application 201480047649.7.

* cited by examiner

REMOTE SERVER

CROSS REFERENCE TO RELATED APPLICATIONS

This is the U.S. national stage of application No. PCT/JP2014/071316, filed on Aug. 12, 2014. Priority under 35 U.S.C. §119(a) and 35 U.S.C. §365(b) is claimed from Japanese Application No. 2013-176841, filed Aug. 28, 2013, the disclosure of which is also incorporated herein by reference.

TECHNICAL FIELD

The present invention relates to a technique of a remote server that determines occurrence of an abnormal condition in a power transmission mechanism.

BACKGROUND ART

Remote servers provide service to remote users. In recent years, even after marketing a working machine, maintenance information and the like are provided to a user by remotely monitoring an operating status of a working machine with a remote server. For example, Patent Literature 1 discloses a configuration that manages a component life of a working machine with the remote server.

On the other hand, Patent Literature 2 discloses a configuration that detects slippage of a belt of a CVT speed changer. However, according to the configuration disclosed in Patent Literature 2, it is necessary to prepare in advance a threshold value for comparison with a difference or a ratio between a theoretical value and an actual measurement value of a speed change ratio. Further, the remote server disclosed in Patent Literature 1 does not disclose a configuration that detects an abnormal condition in a power transmission system.

CITATION LIST

Patent Literature

PLT1: JP 2007-100305 A
PLT2: JP2004-301230 A

SUMMARY OF INVENTION

Technical Problem

An object of the present invention is to provide a remote server that can determine occurrence of an abnormal condition in a power transmission system without using a threshold value in advance.

Solutions to Problem

The remote server of the present invention receives operating and non-operating information of a working unit, information on a working date, information on a moving speed, and information on a load factor of an engine, from a mobile working machine. The remote server calculates for each predetermined period an average of the load factor of the engine while the moving speed is at or above a predetermined moving speed with all working units in non-operation. If the average during a predetermined period is in a status of a predetermined difference from the average during a period before the predetermined period, the remote server determines that a moving power transmission mechanism of the mobile working machine is in an abnormal condition.

The remote server of the present invention receives information on machine types, information on working periods, position information, information on moving speeds, and information on load factors of engines, from mobile working machines. The remote server identifies a working area based on the position information, and compares an average of the load factor of a specific mobile working machine at or above a predetermined moving speed with an average of the load factors of other mobile working machines of a same machine type working on a same working date in a same working area at a same moving speed. If a working period during which the average of the load factor of the specific mobile working machine is higher than the average of the load factors of the other mobile working machines by a predetermined value or more continues for a predetermined period, the remote server determines that a power transmission mechanism of the mobile working machine is in an abnormal condition.

Advantageous Effects of Invention

According to the remote server of the present invention, the load factor of the engine in a non-working and high-speed moving status is compared with an average of the load factor of the engine for each predetermined period by calculating the average. Therefore, the occurrence of the abnormal condition in the power transmission mechanism for moving can be determined without preparing a threshold value in advance.

Further, an average of the load factor in the same working status is compared with a similar average of the load factors of other mobile working machines of the same machine type in the same working area. Therefore, the occurrence of the abnormal condition in the power transmission mechanism can be determined without preparing the threshold value in advance.

DESCRIPTION OF EMBODIMENTS

A remote server system 100 will be described with reference to FIG. 1.

Figure 1:
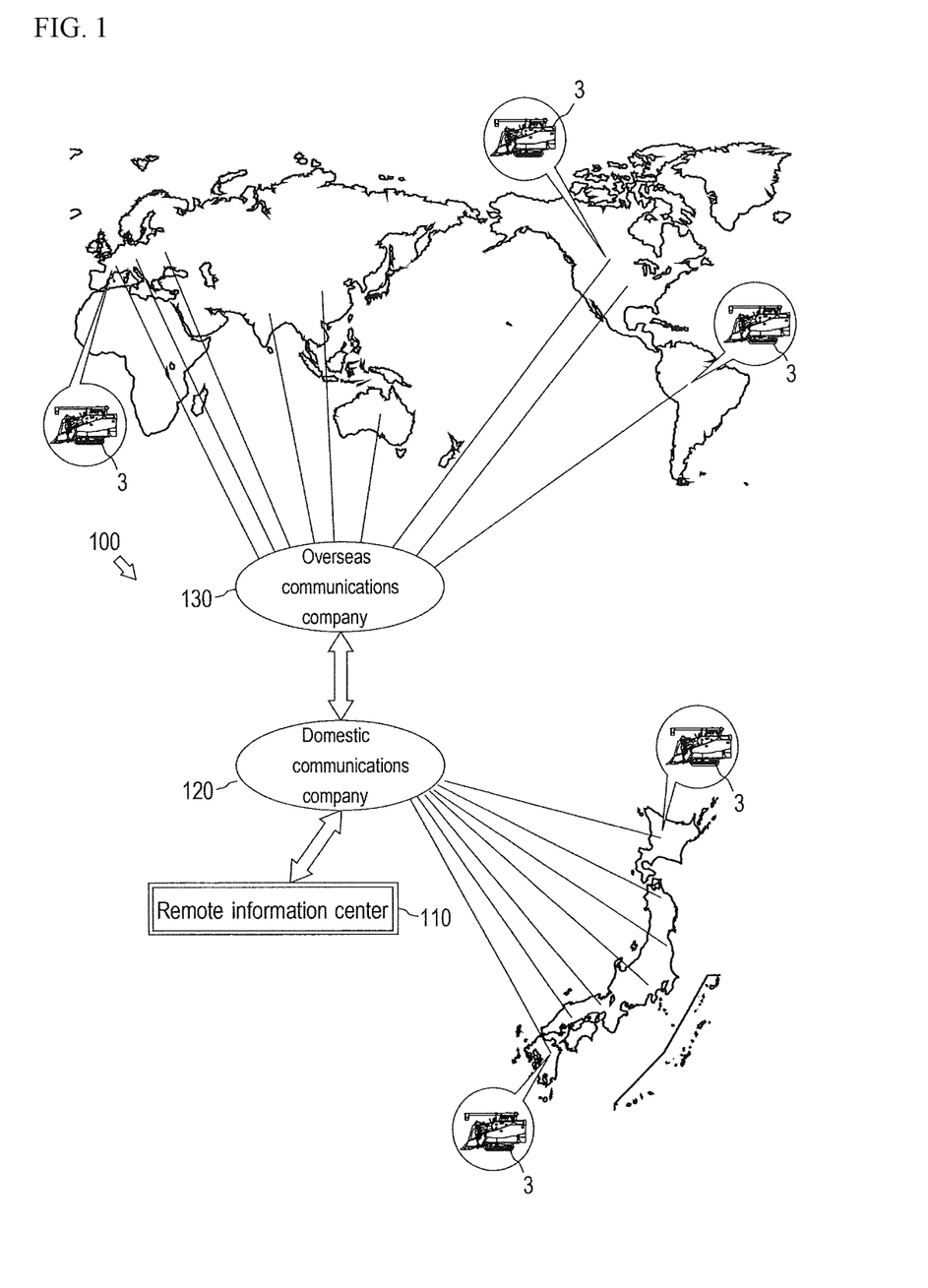
FIG. 1 is a schematic diagram showing a configuration of a remote server system.

FIG. 1 schematically shows the remote server system 100.

The remote server system 100 is a system relating to a remote server according to an embodiment of the present invention. The remote server system 100 is a system that provides service to remote users. The remote server system 100 of the present embodiment is a system that provides a service from a remote information center 110 to users who use combine harvesters 3 as agricultural machines, via an overseas communications company 130 in each country of the world and a domestic communications company 120.

The remote server system 100 will be further described with reference to FIG. 2.

Figure 2:
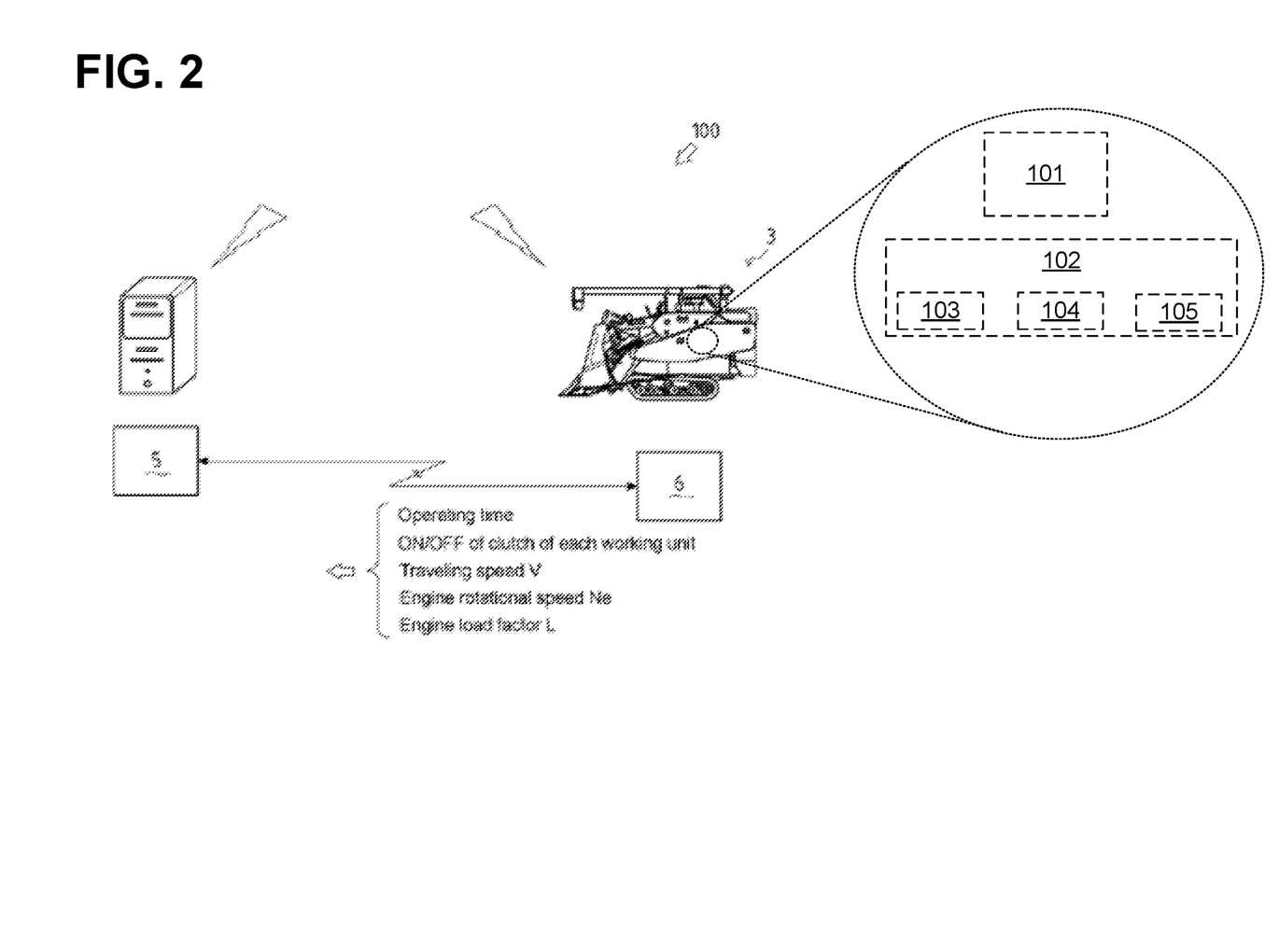
FIG. 2 is another schematic diagram showing a configuration of a remote server system.

FIG. 2 schematically shows the remote server system 100.

The remote server system 100 of the present embodiment is a system that determines occurrence of an abnormal condition in a power transmission mechanism of the combine harvester 3 used by a user, and alerts the user when the power transmission mechanism is in the abnormal condition.

The remote server system 100 is configured such that a remote server 5 provided in the remote information center 110 (refer to FIG. 1) and terminal servers 6 provided in combine harvesters 3 can communicate with each other, for example. The remote server 5 is configured to be able to communicate with terminal servers 6 that are provided in many combine harvesters 3.

In the present embodiment, it is assumed that each terminal server 6 transmits to the remote server 5, at least, year, month, and day of operation and operating hour of the combine harvester 3 as information on an operating day of the combine harvester 3, ON or OFF of a clutch of each working unit (a reaping unit, a conveying unit, a threshing unit, or the like) as operating and non-operating information of the working unit, a traveling speed V as information on a moving speed, an engine rotational speed Ne as information on a rotational speed of the engine (e.g., 101), and an engine load factor L (e.g., 103) as information on a load factor of the engine.

For the engine rotational speed Ne, the engine rotational speed Ne detected by the engine rotational speed sensor is transmitted to the remote server 5.

For the engine load factor L, a ratio of an injection quantity (e.g., 104) instructed by an ECU (Engine Control Unit) (e.g., 102) to a maximum injection quantity (e.g., 105) at the engine rotational speed Ne is transmitted to the remote server 5. For example, according to a mechanical governor engine, a rack position detected by a rack position sensor becomes the engine load factor L. Further, according to an electronic governor engine, an accelerator rotation amount detected by an accelerator opening sensor becomes the engine load factor L.

First Embodiment

A correlation between the working date and the engine load factor L will be described with reference to FIG. 3.

Figure 3:
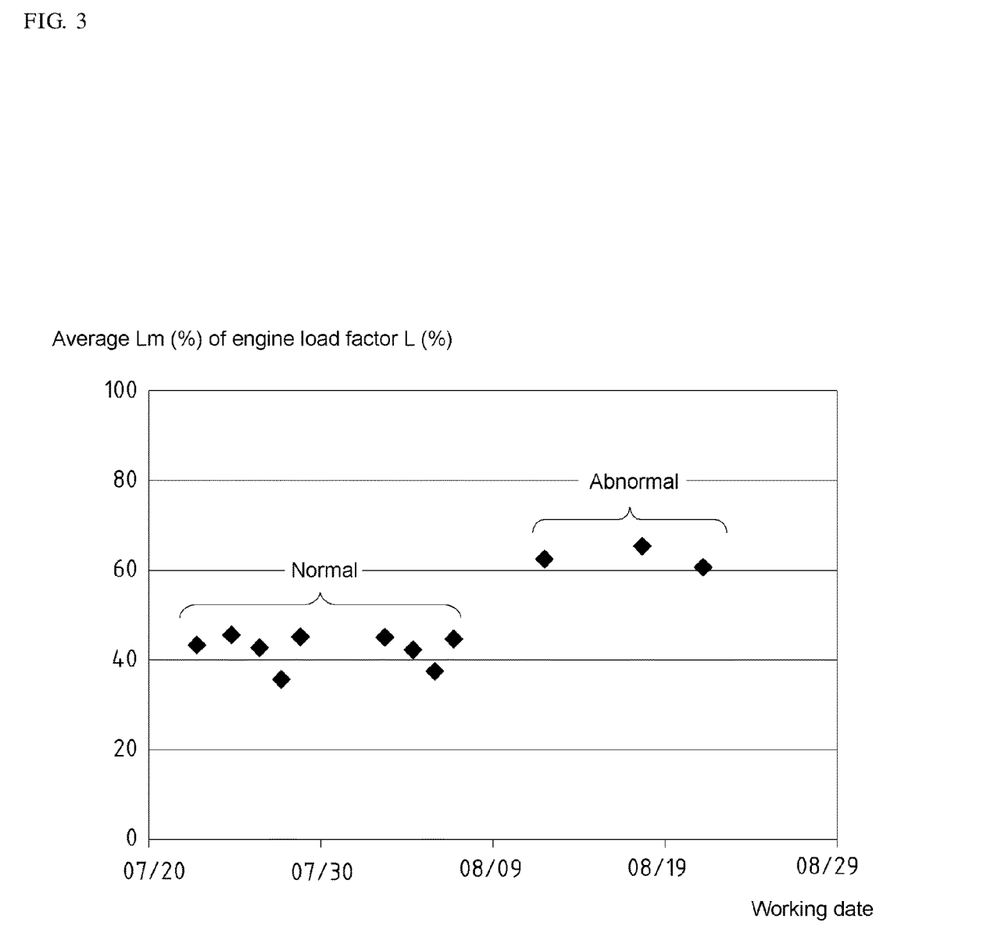
FIG. 3 is a graph diagram showing a correlation between a working date and an average load factor of an engine.

In FIG. 3, the horizontal axis indicates the working date, and the vertical axis indicates an average Lm per day of the engine load factor L. The correlation between the working date and the engine load factor L is shown as a graph.

The average Lm of the engine load factor L in the graph indicates the average Lm of the engine load factor L of the case where the clutch of each working unit (a reaping unit, a conveying unit, a threshing unit, or the like) of the combine harvester 3 on a target operating day is in the OFF status and the traveling speed V is at or above the predetermined traveling speed Va.

That is, the average Lm of the engine load factor L in the graph indicates the average Lm per day of the engine load factor L of the combine harvester 3 that performs only traveling at or above the predetermined traveling speed Va. As shown by the data from July 20 to August 9, according to the combine harvester 3, when the clutch of each working unit is in the OFF status and when the combine harvester 3 is traveling at or above the predetermined traveling speed Va, the average Lm per day of the engine load factor L is approximately the same.

However, as shown by the data after August 9, it is clear that the average Lm per day of the engine load factor L increases after August 9. At this time, in the combine harvester 3, the engine is working for only the power transmission mechanism of the traveling system. Therefore, it can be assumed that the power transmission mechanism of the traveling system is in an abnormal condition.

A flow of an abnormality determination control S100 will be described with reference to FIG. 4.

Figure 4:
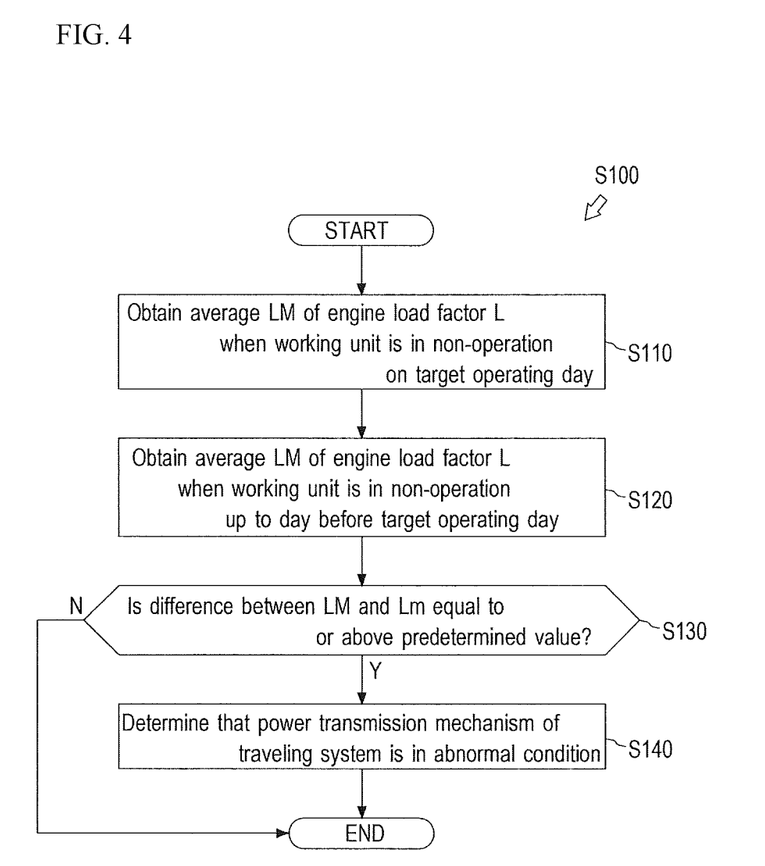
FIG. 4 is a flowchart showing an abnormality determination control in a first embodiment.

FIG. 4 is a flowchart showing the flow of the abnormality determination control S100.

The abnormality determination control S100 is a control of a first embodiment performed by the remote server of the present invention. The abnormality determination control S100 is a control of determining occurrence of an abnormal condition in a power transmission mechanism of a traveling system of the combine harvester 3.

In step S110, the remote server 5 obtains the engine load factor L of the case where the clutch of each working unit (a reaping unit, a conveying unit, a threshing unit, or the like) of the combine harvester 3 on the target operating day is in the OFF status and the traveling speed V is at or above the predetermined traveling speed Va. Then, the remote server 5 calculates the average Lm of the obtained engine load factor L.

In step S120, the remote server 5 obtains the engine load factor L of the case where the clutch of each working unit (a reaping unit, a conveying unit, a threshing unit, or the like) of the combine harvester 3 up to a day before the target operating day is in the OFF status and the traveling speed V is at or above the predetermined traveling speed Va. Then, the average LM of the obtained engine load factor L is calculated.

In step S130, the remote server 5 calculates a difference between the average Lm on the target operating day and the average LM up to the day before the target operating day, and determines whether the calculated difference is larger than a predetermined value. If the difference is larger than the predetermined value, the process proceeds to step S140. If the difference is equal to or smaller than the predetermined value, the combine harvester 3 is normal, and the remote server 5 ends the abnormality determination control S100.

In step S140, the remote server 5 determines that the power transmission mechanism of the traveling system of the combine harvester 3 is in the abnormal condition, and alerts the user of the occurrence of the abnormal condition and ends the abnormality determination control S100. As means for alerting the user, there is considered making a display that the power transmission mechanism of the traveling system is in the abnormal condition, in the operation panel of the combine harvester 3 via the terminal server 6, or directly reporting to the user.

An effect of the remote server 5 and the abnormality determination control S100 will be described.

According to the remote server 5 and the abnormality determination control S100, the engine load factor L of the case where the combine harvester 3 is non-working and is at or above the predetermined traveling speed Va is compared with an average LM for each working date by calculating the average. Therefore, the occurrence of the abnormal condition in the power transmission mechanism of a traveling system can be determined without preparing a threshold value in advance.

Second Embodiment

A correlation between each machine type and the engine load factor L will be described with reference to FIG. 5.

Figure 5:
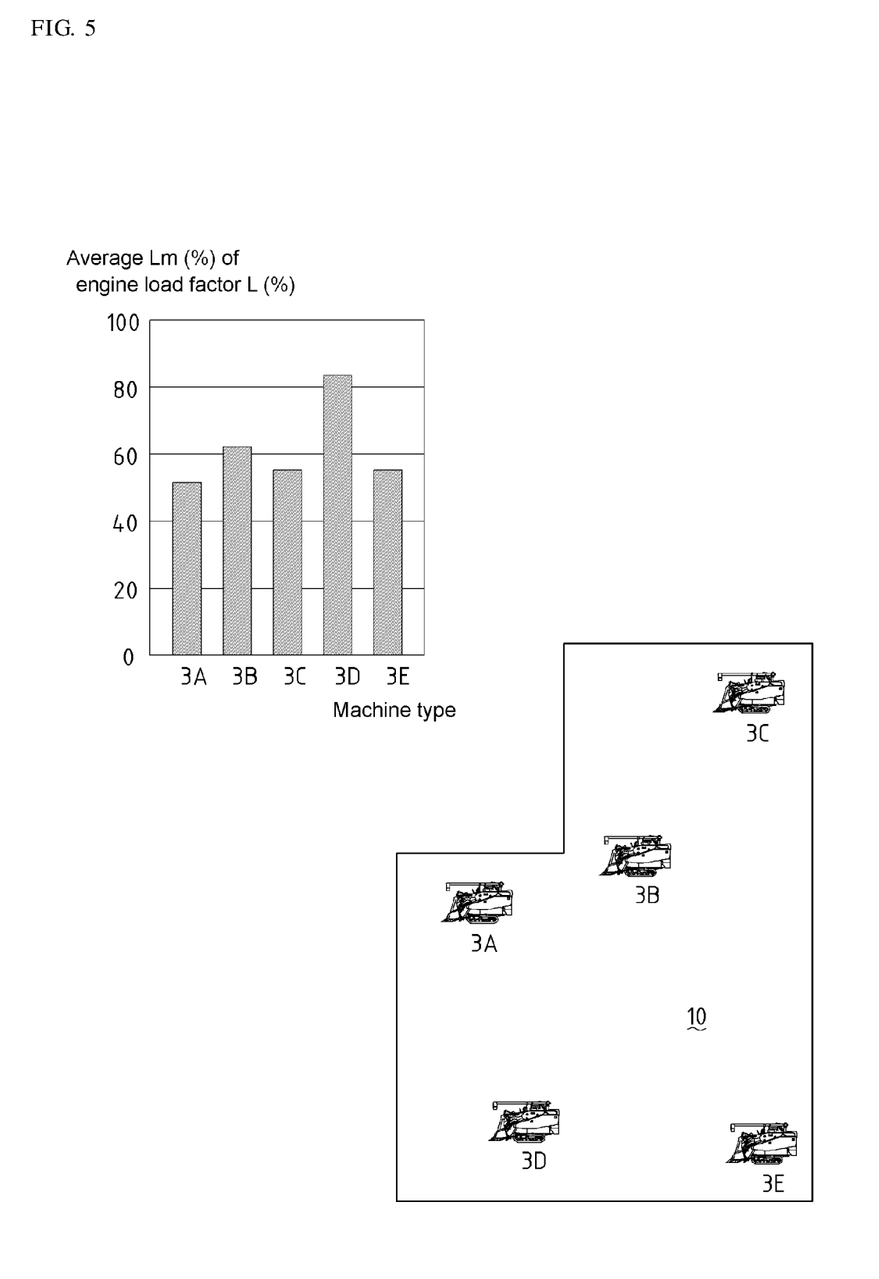
FIG. 5 is a graph diagram showing a correlation between each working vehicle and an average load factor of the engine.

In the left upper side of FIG. 5, the horizontal axis indicates the machine type, and the vertical axis indicates the average Lm per day of the engine load factor L. The correlation between the machine type and the engine load factor L is shown as a graph. In the right lower side of FIG. 5, combine harvesters 3A to 3E that work in the farm field 10 are schematically shown.

As shown in the right lower side of FIG. 5, it is assumed that a plurality of (five) combine harvesters 3A to 3E are working in one farm field 10. The plurality of combine harvesters 3A to 3E that work in one farm field in this way are usually performing the same work (mere traveling, reaping work, threshing work, or the like). Respective traveling speeds V of the plurality of combine harvesters 3A to 3E that perform the same work are usually approximately the same.

As shown in the left upper side of FIG. 5, the average Lm of the engine load factor L in the graph indicates the average Lm of the engine load factor L of each of combine harvesters 3A to 3E on the target operating day, of the case where the traveling speed V of each of the combine harvesters 3A to 3E is at or above a predetermined traveling speed Vb. For example, it is assumed that the combine harvesters 3A to 3E are performing reaping work.

As is clear from the graph, out of the combine harvesters 3A to 3E that are performing the same work in one farm field 10, the average Lm of the engine load factor L of the combine harvester 3D indicates a high rate. At this time, in the combine harvesters 3A to 3E, engines are working for only power transmission mechanisms of traveling systems and reaping systems. Therefore, it can be assumed that the power transmission mechanism of the traveling system or the reaping system of the combine harvester 3D is in an abnormal condition.

The flow of an abnormality determination control S200 will be described with reference to FIG. 6.

Figure 6:
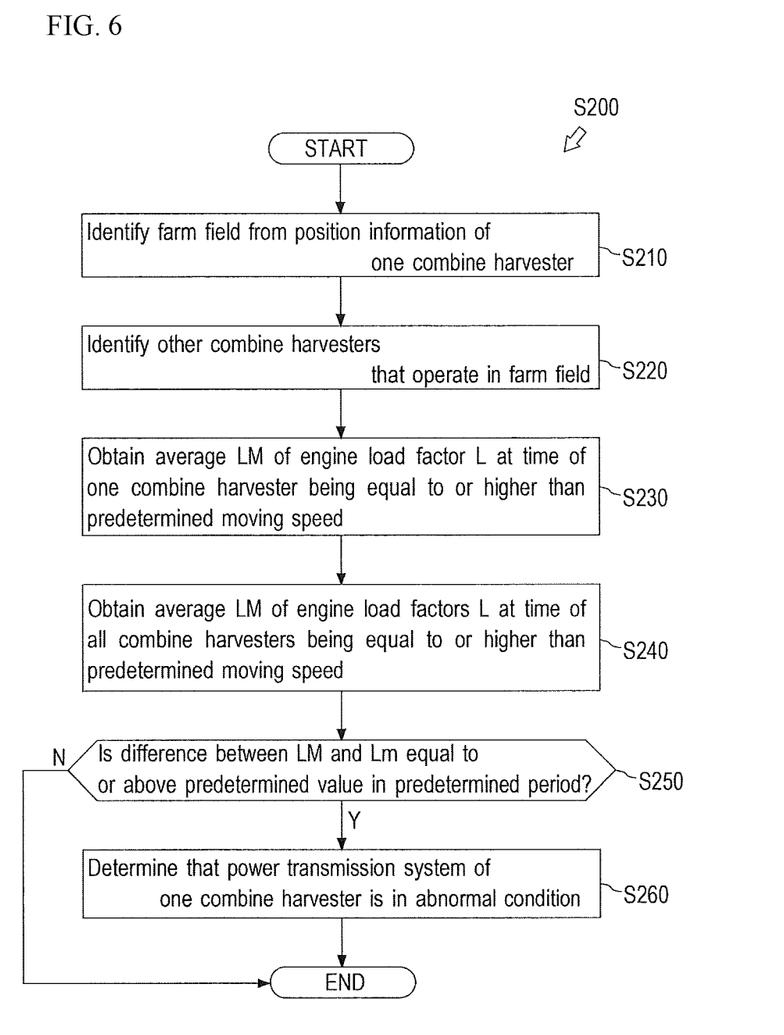
FIG. 6 is a flowchart showing an abnormality determination control in a second embodiment.

FIG. 6 is a flowchart showing the flow of the abnormality determination control S200.

The abnormality determination control S200 is a control of a second embodiment performed by the remote server of the present invention. The abnormality determination control S200 is a control of determining occurrence of an abnormal condition of a certain power transmission mechanism of the combine harvester 3.

In step S210, the remote server 5 identifies one farm field 10 from the position information of the combine harvester 3A, for example.

In step S220, the remote server 5 identifies the combine harvesters 3B to 3E, for example, that are simultaneously working in the identified farm field 10.

In step S230, the remote server 5 obtains the engine load factor L of the case where the traveling speed V of the combine harvester 3A on the target operating day is equal to or higher than the predetermined traveling speed Va. Then, the remote server 5 calculates the average Lm of the obtained engine load factor L.

In step S240, the remote server 5 obtains each engine load factor L of the case where the traveling speeds V of all the combine harvesters 3A to 3E that work in one farm field 10 on the target operating day are equal to or higher than the predetermined traveling speed Va. Then, the average LM of the obtained engine load factors L is calculated.

In step S250, the remote server 5 calculates a difference between the average Lm of the combine harvester 3A and the average LM of the combine harvesters 3A to 3E, and determines whether the calculated difference is larger than a predetermined value during a predetermined period. If the difference is larger than the predetermined value, the process proceeds to step S140. If the difference is equal to or smaller than the predetermined value, the combine harvester 3A is normal, and the remote server 5 ends the abnormality determination control S200.

In step S260, the remote server 5 determines that any one of power transmission mechanisms of the combine harvester 3A is in the abnormal condition, and alerts the user of the occurrence of the abnormal condition and ends the abnormality determination control S200. As means for alerting the user, there is considered making a predictive display that the power transmission mechanism of the traveling system or the reaping system is in the abnormal condition, in the operation panel of the combine harvester 3A via the terminal server 6, or directly reporting to the user.

An effect of the remote server 5 and the abnormality determination control S200 will be described.

According to the remote server 5 and the abnormality determination control S200, an average of the load factor of the engine in the same working status is compared with a similar average of load factors of other combine harvesters of the same machine type in the same working area. Therefore, the occurrence of the abnormal condition in the power transmission mechanism can be determined without preparing the threshold value in advance.

In the present embodiment, the occurrence of the abnormal condition in the power transmission mechanism is determined for the user who uses the combine harvester 3. However, the present invention is not limited thereto. For example, the occurrence of the abnormal condition in the power transmission mechanism may be determined for a user who uses a tractor, a rice planting machine, or the like.

INDUSTRIAL APPLICABILITY

The present invention can be utilized for a remote server.

REFERENCE SIGNS LIST

3 Combine harvester
5 Remote server
6 Terminal server
10 Farm field
100 Remote server system

The invention claimed is:

1. A system comprising:
a remote server configured to:
receive, from a work vehicle terminal associated with a work vehicle, an operational status of a plurality of working units of the work vehicle, traveling speed of the work vehicle, an engine rotational speed of an engine of the work vehicle, an injection ratio of an injection quantity and a maximum injection quantity at the engine rotational speed, and date and time information;
calculate an average load factor for a predetermined period and a period prior to the predetermined period, the average load factor being an average of injection ratio when the operational status of the plurality of working units is OFF and the traveling speed is above a predetermined minimum traveling speed;

calculate a difference between the average load factor of the predetermined period and the average load factor of the period prior to the predetermined period; and output, in response to the difference being greater than a predetermined threshold a signal alerting that a power transmission mechanism is in an abnormal condition.

2. A system comprising:

a remote server configured to:

receive, from each of multiple work vehicle terminals that is associated with a corresponding work vehicle of a plurality of work vehicles, operational status of a plurality of working units of the corresponding work vehicle, traveling speed of the corresponding work vehicle, engine rotational speed of an engine of the corresponding work vehicle, an injection ratio of an injection quantity and a maximum injection quantity at the engine rotational speed of the corresponding work vehicle, and date and time information to the remote server;

calculate an average load factor for each of the plurality of work vehicles, the average load factor being an average of injection ratio when an operation status of the plurality of working units is in a predetermined configuration and the traveling speed is above a predetermined minimum traveling speed;

calculate an overall average load factor of the average load factors for each of the plurality of work vehicles;

calculate a difference between an average load factor of a particular work vehicle of the plurality of work vehicles and the overall average load factor; and output, in response to the difference being greater than a predetermined threshold a signal alerting that a power transmission mechanism is in an abnormal condition.

3. The system of claim 2, wherein the predetermined configuration of the operation status of the plurality of working units is that an operation status of a specific working unit of the plurality of working units is ON, while an operation status of the remaining working units of the plurality of working units is OFF.

4. The system of claim 1, further comprising:

the work vehicle comprising:
the engine;
the plurality of working units;
an engine rotational speed sensor configured to measure the engine rotational speed of the engine;
an engine control unit configured to instruct an instructed injection quantity of the engine; and
the work vehicle terminal operably connected to the engine and the plurality of working units, the work vehicle terminal configured to:
calculate the injection ratio of the injection quantity to the maximum injection quantity at the measured engine rotational speed; and
periodically transmit the operational status of each of the plurality of working units, the traveling speed of the work vehicle, the engine rotational speed, the injection ratio, and date and time information to the remote server.

5. The system of claim 2, further comprising:

the plurality of work vehicles, each of the plurality of work vehicles comprising:
an engine rotational speed sensor configured to measure the engine rotational speed of the engine;
an engine control unit structured to configured an instructed injection quantity of the engine; and
a work vehicle terminal operably connected to the engine and the plurality of working units the work vehicle, the work vehicle terminal is configured to:
calculate the injection ratio of the injection quantity to the maximum injection quantity at the measured engine rotational speed of the work vehicle; and
periodically transmit date and time information; operational status of each of the plurality of working units, traveling speed of the work vehicles, the engine rotational speed, the injection ratio, and date and time information to the remote server.

6. A method for determining abnormal condition in a power transmission mechanism of a work vehicle, the method comprising:

receiving, at a remote server from each of multiple work vehicle terminals that is associated with a corresponding work vehicle of a plurality of work vehicles, operational status of a plurality of working units of the corresponding work vehicle, traveling speed of the corresponding work vehicle, engine rotational speed of an engine of the corresponding work vehicle, an injection ratio of an injection quantity and a maximum injection quantity at the engine rotational speed of the corresponding work vehicle, and date and time information to the remote server;

calculating an average load factor for each of the plurality of work vehicles, the average load factor being an average of injection ratio when an operation status of the plurality of working units is in a predetermined configuration and the traveling speed is above a predetermined minimum traveling speed;

calculating an overall average load factor of the average load factors for each of the plurality of work vehicles;

calculating a difference between an average load factor of a particular work vehicle of the plurality of work vehicles and the overall average load factor; and outputting, in response to the difference being greater than a predetermined threshold a signal alerting that the power transmission mechanism is in an abnormal condition.

* * * * *